(12) United States Patent
Zhang

(10) Patent No.: US 11,320,352 B2
(45) Date of Patent: May 3, 2022

(54) RAPID ROTATION OPENING TYPE HIGH-PRESSURE ROCK TRIAXIAL PRESSURE CHAMBER WITH LOADING STRUCTURE

(71) Applicant: Northeastern University, Shenyang (CN)

(72) Inventor: Xiwei Zhang, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 186 days.

(21) Appl. No.: 16/961,900

(22) PCT Filed: Jun. 28, 2019

(86) PCT No.: PCT/CN2019/093514
§ 371 (c)(1),
(2) Date: Jul. 13, 2020

(87) PCT Pub. No.: WO2020/258207
PCT Pub. Date: Dec. 30, 2020

(65) Prior Publication Data
US 2021/0156773 A1   May 27, 2021

(30) Foreign Application Priority Data
Jun. 24, 2019   (CN) .......................... 201910548565.6

(51) Int. Cl.
*G01N 3/10*   (2006.01)
*G01N 3/12*   (2006.01)
*G01N 3/02*   (2006.01)

(52) U.S. Cl.
CPC ................ *G01N 3/02* (2013.01); *G01N 3/12* (2013.01); *G01N 2203/0019* (2013.01); *G01N 2203/0048* (2013.01); *G01N 2203/0256* (2013.01)

(58) Field of Classification Search
CPC combination set(s) only.
See application file for complete search history.

(56) References Cited

U.S. PATENT DOCUMENTS 9,194,784 B1   11/2015   Bi et al.

FOREIGN PATENT DOCUMENTS

| CN | 102116720 A | 7/2011 |
|---|---|---|
| CN | 103728175 A | 4/2014 |

(Continued)

*Primary Examiner* — Brandi N Hopkins
(74) *Attorney, Agent, or Firm* — Muncy, Geissler, Olds & Lowe, P.C.

(57) ABSTRACT

The invention relates to a rapid rotation opening type high-pressure rock triaxial pressure chamber with a loading structure, a traditional loading frame is omitted, a pressure chamber shell is fixedly connected with an actuator cylinder barrel through high-strength bolts to form a counterforce body loading maximum principal stress, clearance is saved by 50%. An opening manner of up-and-down motion is abandoned, a pressure chamber sealing and spacing sleeve is sleeved outside the pressure chamber shell and can rotate, rock specimen access openings are formed on the pressure chamber shell and the pressure chamber sealing and spacing sleeve, and a dismountable plugging block is arranged in each rock specimen access opening in the pressure chamber shell, so that a rapid rotation opening manner is achieved. As such, a traditional process in which the high-strength bolts need to be disassembled and assembled is omitted.

7 Claims, 1 Drawing Sheet

(56) References Cited

FOREIGN PATENT DOCUMENTS

| | | | |
|---|---|---|---|
| CN | 104155175 | A | 11/2014 |
| CN | 105806710 | A | 7/2016 |
| CN | 206192784 | U | 5/2017 |
| CN | 109357953 | A | 2/2019 |

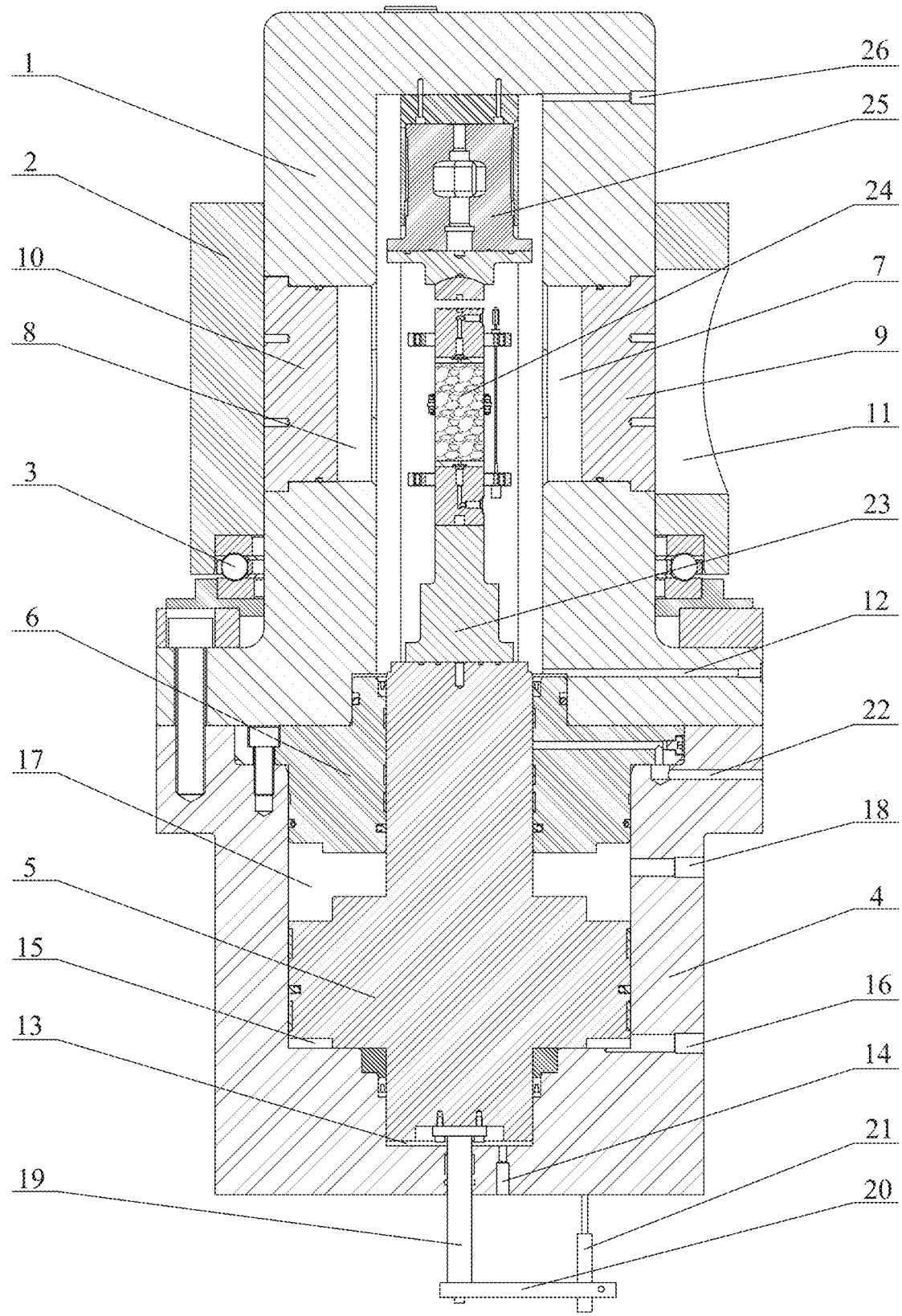

RAPID ROTATION OPENING TYPE HIGH-PRESSURE ROCK TRIAXIAL PRESSURE CHAMBER WITH LOADING STRUCTURE

BACKGROUND OF THE INVENTION

1. Field of the Invention

The present invention relates to a rock triaxial compression testing device in laboratory, and more particularly to a rapid rotation opening type high-pressure rock triaxial pressure chamber with an attached loading structure.

2. The Prior Arts

Rock is a kind of geologic materials, which his different from metal materials, the compression strength of the geologic materials is notably influenced by confining pressure (also called lateral stress), usually the compression strength of rock specimens can be certainly increased through exerting a higher confining pressure level around cylindrical rock specimens, and in order to obtain mechanical characteristics of compression strength, deformation of rocks under the condition of different confining pressures, usually a rock conventional triaxial testing machine is used as testing equipment.

Although deep underground rock masses subjected to the unequal crustal stress in three orthogonal directions in different degrees, namely maximum principal stress, intermediate principal stress and minimum principal stress, considering the respects of design difficulty and test efficiency of the testing machine, most of the rock mechanicals tests can use cylindrical rock specimens, and besides, a rock conventional triaxial testing machine is used for developing conventional triaxial compression tests under the condition of different confining pressures (equal intermediate principal stress and minimum principal stress).

The rock conventional triaxial testing machine mainly consists of two parts of a loading frame and a pressure chamber, wherein the loading frame is used for applying the maximum principal stress, while the pressure chamber is used for applying the confining pressure. After the sealed cylindrical specimens are placed in the pressure chamber, firstly equivalent confining pressures are applied to simulate different stratum pressures, and then the loading frame is used for applying axial loads until the rock specimens are pressed to be destroyed and failure. The pressure chamber consists of two parts of an upper part structure and a lower part structure and uses an opening manner of up-and-down motion, besides, the upper part structure and the lower part structure of the pressure chamber are connected through high-strength bolts which need to bear pull force generated by high pressure in the pressure chamber. In order to apply axial maximum principal stress, a metal force transmitting rod with a sealing structure also needs to be arranged at the upper part of the pressure chamber. The most classical rock conventional triaxial testing machines comprise an American MTS Model 815 type and American GCTS RTR-4000 type.

Furthermore, in order to obtain the post-peak curve of hard rock compression failure, the rock conventional triaxial testing machine generally refers to the suggested method of the rock uniaxial compression complete stress-strain curve test suggested by the International Society for Rock Mechanics in 1999 (Draft ISRM Suggested Method for the complete stress-strain curve for intact rock uniaxial compression), and for the method, 5 MN/mm is suggested as the design standard for loading frame rigidity.

A metal pressure chamber needs to be placed at the middle part of the loading frame, which results in increase of the span between the upper and lower clearance of the loading frame and two upright columns, under the premise of ensuring that the loading frame rigidity reaches the recommended value 5 MN/mm, the cross-sectional area of the upright column needs to be increased, besides, high-elastic-modulus alloy steel materials also need to be used. In such a design scheme, a substantial increase in the alloy steel materials is caused, the total cost is increased, and mounting and positioning precision of the loading frame is not liable to guarantee.

In addition, because the metal pressure chamber of the rock conventional triaxial testing machine uses the opening manner of up-and-down motion to achieve assembly and disassembly of the rock specimens, it is necessary to manually complete disassembly and assembly of 10-16 high-strength bolts through wrenches. The disassembly and assembly process of the high-strength bolts is quite time-consuming and labor-consuming, the pretension force of each high-strength bolt is not liable to guarantee, and besides, the efficiency of the rock conventional triaxial test is also greatly reduced.

Further, after the pressure chamber is lifted each time, it needs to take considerable time to wait for hydraulic oil on the inner wall of the pressure chamber to drip thoroughly. Because the viscosity of the hydraulic oil is larger, the process that the hydraulic oil drips thoroughly generally needs 10-20 minutes, and in addition, the hydraulic oil also easily drips onto a test bench or the ground, causing pollution of the surrounding environment.

SUMMARY OF THE INVENTION

A primary objective of the present invention is to provide a rapid rotation opening type high-pressure rock triaxial pressure chamber that attaches a loading structure, wherein a loading frame designed in a traditional structure is omitted, under the premise of guaranteeing test capacity not to be reduced, clearance is saved by 50%, conditions are created for further promotion of structural rigidity, and reduction of manufacturing cost of equipment is also facilitated.

Another objective of the present invention is to provide a rapid rotation opening type high-pressure rock triaxial pressure chamber that attaches a loading structure, wherein a traditional opening manner of up-and-down motion is abandoned, a rapid rotation opening manner is used for the first time, a traditional process in which high-strength bolts need to be assembled and disassembled is omitted, the assembling and disassembling time of the rock specimens can be saved by 1 hour, the labor intensity of staff can be reduced, the test efficiency is also effectively improved, and besides, the problem of surrounding environment pollution caused by dripping of hydraulic oil is also solved in the rapid rotation opening manner.

To achieve the above objectives, the present invention provides a rapid rotation opening type high-pressure rock triaxial pressure chamber with a loading structure comprises a pressure chamber shell, a pressure chamber sealing and spacing sleeve, a thrust ball bearing, an actuator cylinder barrel, an actuator piston rod and an actuator sealing flange cover.

The pressure chamber shell is a cylindrical barrel structure and is vertically arranged, a lower end barrel opening of the pressure chamber shell faces downwards, and a flange edge is arranged on an outer periphery of the lower end barrel opening of the pressure chamber shell.

The thrust ball bearing is sleeved on an outer side of the pressure chamber shell, a central axis of the thrust ball bearing overlaps with a central axis of the pressure chamber shell, and a lower part bearing ring of the thrust ball bearing is fixedly connected with the flange edge at the lower end barrel opening of the pressure chamber shell.

The pressure chamber sealing and spacing sleeve is sleeved on the outer side of the pressure chamber shell, a central axis of the pressure chamber sealing and spacing sleeve overlaps with the central axis of the pressure chamber shell, the pressure chamber sealing and spacing sleeve is located above the thrust ball bearing, a bottom end of the pressure chamber sealing and spacing sleeve is fixedly connected with an upper part bearing ring of the thrust ball bearing, and a rotation gap is formed between the pressure chamber sealing and spacing sleeve and the pressure chamber shell.

A first rock specimen access opening and a second rock specimen access opening are respectively formed at two opposite sides on a lateral barrel wall of the pressure chamber shell, the first rock specimen access opening and the second rock specimen access opening are the same in size, shape and height position and are formed directly facing each other.

A first plugging block is arranged at the first rock specimen access opening, and the first plugging block and the first rock specimen access opening are in a sealing and sliding cooperation manner.

A second plugging block is arranged at the second rock specimen access opening, and the second plugging block and the second rock specimen access opening are in a sealing and sliding cooperation manner.

A third rock specimen access opening is formed on a barrel wall of the pressure chamber sealing and spacing sleeve, the third rock specimen access opening, the first rock specimen access opening and the second rock specimen access opening are in the same height, and a hole diameter of the third rock specimen access opening is larger than that of the first rock specimen access opening and that of the second rock specimen access opening.

The actuator cylinder barrel is a cylindrical barrel structure and is vertically arranged, an upper end barrel opening of the actuator cylinder barrel faces upwards, a flange edge is arranged on an outer periphery of the upper end barrel opening of the actuator cylinder barrel, the upper end barrel opening of the actuator cylinder barrel is abutted with the lower end barrel opening of the pressure chamber shell, the flange edge at the upper end barrel opening of the actuator cylinder barrel is fixedly connected with the flange edge at the lower end barrel opening of the pressure chamber shell through high-strength bolts, a counterforce main body loading maximum principal stress is jointly formed by the pressure chamber shell and the actuator cylinder barrel, and a central axis of the actuator cylinder barrel overlaps with the central axis of the pressure chamber shell.

The actuator piston rod is arranged in the actuator cylinder barrel, a central axis of the actuator piston rod overlaps with the central axis of the actuator cylinder barrel, and a middle part rod body of the actuator piston rod and the actuator cylinder barrel are in a sealing and sliding cooperation manner.

The actuator sealing flange cover is fixedly mounted at the upper end barrel opening of the actuator cylinder barrel through high-strength bolts, the actuator sealing flange cover and the upper end barrel opening of the actuator cylinder barrel are in a sealing cooperation manner, a piston rod penetrating and mounting hole is formed in a center of the actuator sealing flange cover, an upper part rod body of the actuator piston rod penetrates through the piston rod penetrating and mounting hole of the actuator sealing flange cover and extends to an inner part of the pressure chamber shell, and the upper part rod body of the actuator piston rod and the actuator sealing flange cover are in a sealing and sliding cooperation manner.

A confining pressure oil opening is formed on a bottom barrel body of the pressure chamber shell, a pressure balance cavity is formed on a bottom barrel body of the actuator cylinder barrel, a pressure balance oil opening is formed on the actuator cylinder barrel below the pressure balance cavity, and the pressure balance oil opening communicates with the confining pressure oil opening; and wherein a lower part rod body of the actuator piston rod extends into the pressure balance cavity, and the lower part rod body of the actuator piston rod and the pressure balance cavity are in a sealing and sliding cooperation manner.

An annular space in the actuator cylinder barrel below the middle part rod body of the actuator piston rod is a stress loading cavity, and a stress loading oil opening is formed on the actuator cylinder barrel at a corresponding position of the stress loading cavity; and wherein an annular space in the actuator cylinder barrel above the middle part rod body of the actuator piston rod is a stress unloading cavity, and a stress unloading oil opening is formed on the actuator cylinder barrel at a corresponding position of the stress unloading cavity.

A piston displacement monitoring rod is mounted on the actuator cylinder barrel below the pressure balance cavity in a sealing and sliding cooperation manner, an upper end of the piston displacement monitoring rod is fixedly connected to a bottom end of the actuator piston rod, a lower end of the piston displacement monitoring rod extends to an outside of the actuator cylinder barrel, a transferring propping rod is fixedly connected to the lower end of the piston displacement monitoring rod, and a displacement sensor is connected between the transferring propping rod and the actuator cylinder barrel.

An oil leakage monitoring opening is formed on the actuator cylinder barrel at a corresponding position of the actuator sealing flange cover.

A rock specimen supporting frame is fixedly mounted at a top portion of the actuator piston rod, is located in the pressure chamber shell, and is used for allowing rock specimens to be placed thereon, and a force measuring sensor is fixedly hoisted on an inner barrel wall at a top portion of the pressure chamber shell right above the rock specimen supporting frame.

An exhaust opening is formed on a top barrel body of the pressure chamber shell.

The rapid rotation opening type high-pressure rock triaxial pressure chamber with a loading structure disclosed by the invention has the beneficial effects as follows:

A loading frame designed in a traditional structure is omitted, under the premise of guaranteeing test capacity not to be reduced, clearance is saved by 50%, conditions are created for further promotion of structural rigidity, and reduction of manufacturing cost of equipment is also facilitated.

A traditional opening manner of up-and-down motion is abandoned, a rapid rotation opening manner is used for the first time, a traditional process in which high-strength bolts need to be assembled and disassembled is omitted, the assembling and disassembling time of the rock specimens can be saved by 1 hour, the labor intensity of staff can be reduced, the test efficiency is also effectively improved, and besides, the problem of surrounding environment pollution caused by dripping of hydraulic oil is also solved in the rapid rotation opening manner.

BRIEF DESCRIPTION OF THE DRAWINGS

FIGURE is a structural schematic diagram of a rapid rotation opening type high-pressure rock triaxial pressure chamber with a loading structure of the present invention.

DETAILED DESCRIPTION OF THE PREFERRED EMBODIMENT

The detailed description of the present invention is further elaborated in combination with the drawings and the embodiments.

As shown in the FIGURE, a rapid rotation opening type high-pressure rock triaxial pressure chamber with a loading structure comprises a pressure chamber shell 1, a pressure chamber sealing and spacing sleeve 2, a thrust ball bearing 3, an actuator cylinder barrel 4, an actuator piston rod 5 and an actuator sealing flange cover 6.

The pressure chamber shell 1 is a cylindrical barrel structure and is vertically arranged, a lower end barrel opening of the pressure chamber shell 1 faces downwards, and a flange edge is arranged on an outer periphery of the lower end barrel opening of the pressure chamber shell 1.

The thrust ball bearing 3 is sleeved on an outer side of the pressure chamber shell 1, a central axis of the thrust ball bearing 3 overlaps with a central axis of the pressure chamber shell 1, and a lower part bearing ring of the thrust ball bearing 3 is fixedly connected with the flange edge at the lower end barrel opening of the pressure chamber shell 1.

The pressure chamber sealing and spacing sleeve 2 is sleeved on the outer side of the pressure chamber shell 1, a central axis of the pressure chamber sealing and spacing sleeve 2 overlaps with the central axis of the pressure chamber shell 1, the pressure chamber sealing and spacing sleeve 2 is located above the thrust ball bearing 3, a bottom end of the pressure chamber sealing and spacing sleeve 2 is fixedly connected with an upper part bearing ring of the thrust ball bearing 3, and a rotation gap is formed between the pressure chamber sealing and spacing sleeve 2 and the pressure chamber shell 1.

A first rock specimen access opening 7 and a second rock specimen access opening 8 are respectively formed at two opposite sides on a lateral barrel wall of the pressure chamber shell 1, the first rock specimen access opening 7 and the second rock specimen access opening Bare the same in size, shape and height position and are formed directly facing each other.

A first plugging block 9 is arranged at the first rock specimen access opening 7, and the first plugging block 9 and the first rock specimen access opening 7 are in a sealing and sliding cooperation manner.

A second plugging block 10 is arranged in the second rock specimen access opening 8, and the second plugging block 10 and the second rock specimen access opening 8 are in a sealing and sliding cooperation manner.

A third rock specimen access opening 11 is formed on a barrel wall of the pressure chamber sealing and spacing sleeve 2, the third rock specimen access opening 11, the first rock specimen access opening 7 and the second rock specimen access opening 8 are in the same height, and a hole diameter of the third rock specimen access opening 11 is larger than that of the first rock specimen access opening 7 and that of the second rock specimen access opening 8.

The actuator cylinder barrel 4 is a cylindrical barrel structure and is vertically arranged, an upper end barrel opening of the actuator cylinder barrel 4 faces upwards, a flange edge is arranged on an outer periphery of the upper end barrel opening of the actuator cylinder barrel 4, the upper end barrel opening of the actuator cylinder barrel 4 is abutted with the lower end barrel opening of the pressure chamber shell 1, the flange edge at the upper end barrel opening of the actuator cylinder barrel 4 is fixedly connected with the flange edge at the lower end barrel opening of the pressure chamber shell 1 through high-strength bolts, a counterforce main body loading maximum principal stress is jointly formed by the pressure chamber shell 1 and the actuator cylinder barrel 4, and a central axis of the actuator cylinder barrel 4 overlaps with the central axis of the pressure chamber shell 1.

The actuator piston rod 5 is arranged in the actuator cylinder barrel 4, a central axis of the actuator piston rod 5 overlaps with the central axis of the actuator cylinder barrel 4, and a middle part rod body of the actuator piston rod 5 and the actuator cylinder barrel 4 are in a sealing and sliding cooperation manner.

The actuator sealing flange cover 6 is fixedly mounted at the upper end barrel opening of the actuator cylinder barrel 4 through high-strength bolts, the actuator sealing flange cover 6 and the upper end barrel opening of the actuator cylinder barrel 4 are in a sealing cooperation manner, a piston rod penetrating and mounting hole is formed in a center of the actuator sealing flange cover 6, an upper part rod body of the actuator piston rod 5 penetrates through the piston rod penetrating and mounting hole of the actuator sealing flange cover 6 and extends to an inner part of the pressure chamber shell 1, and the upper part rod body of the actuator piston rod 5 and the actuator sealing flange cover 6 are in a sealing and sliding cooperation manner.

A confining pressure oil opening 12 is formed on a bottom barrel body of the pressure chamber shell 1, a pressure balance cavity 13 is formed on a bottom barrel body of the actuator cylinder barrel 4, a pressure balance oil opening 14 is formed on the actuator cylinder barrel 4 below the pressure balance cavity 13, and the pressure balance oil opening 14 communicates with the confining pressure oil opening 12; and wherein a lower part rod body of the actuator piston rod 5 extends into the pressure balance cavity 13, and the lower part rod body of the actuator piston rod 5 and the pressure balance cavity 13 are in a sealing and sliding cooperation manner. After confining pressure exertion is completed in an inner cavity of the pressure chamber shell 1, or when the stress loading cavity 15 of the actuator cylinder barrel 4 is stuffed with oil, the actuator piston rod 5 can be prevented from being subjected to confining pressure interference to generate disturbance through the communication state of the pressure balance oil opening 14 and the confining pressure oil opening 12, and further the actuator piston rod 5 is guaranteed to be always in the balance state.

An annular space in the actuator cylinder barrel 4 below the middle part rod body of the actuator piston rod 5 is a stress loading cavity 15, and a stress loading oil opening 16 is formed on the actuator cylinder barrel 4 at a corresponding position of the stress loading cavity 15; and wherein an annular space in the actuator cylinder barrel 4 above the middle part rod body of the actuator piston rod 5 is a stress unloading cavity 17, and a stress unloading oil opening 18 is formed in the actuator cylinder barrel 4 at a corresponding position of the stress unloading cavity 17.

A piston displacement monitoring rod 19 is mounted on the actuator cylinder barrel 4 below the pressure balance cavity 13 in a sealing and sliding cooperation manner, an upper end of the piston displacement monitoring rod 19 is fixedly connected to a bottom end of the actuator piston rod 5, a lower end of the piston displacement monitoring rod 19 extends to an outside of the actuator cylinder barrel 4, a transferring propping rod 20 is fixedly connected to the lower end of the piston displacement monitoring rod 19, and a displacement sensor 21 is connected between the transferring propping rod 20 and the actuator cylinder barrel 4.

An oil leakage monitoring opening 22 is formed on the actuator cylinder barrel 4 at a corresponding position of the actuator sealing flange cover 6, the inner cavity of the pressure chamber shell 1 and an inner cavity of the actuator cylinder barrel 4 are not in communication with each other, so that the situation that hydraulic oil in the inner cavity of the pressure chamber shell 1 and the hydraulic oil in the inner cavity of the actuator cylinder barrel 4 are not subjected to contact and mix together, can be guaranteed.

A rock specimen supporting frame 23 is fixedly mounted at a top portion of the actuator piston rod 5, is located in the pressure chamber shell 1, and is used for allowing rock specimens 24 to be placed thereon, and a force measuring sensor 25 is fixedly hoisted on an inner barrel wall at a top portion of the pressure chamber shell 1 right above the rock specimen supporting frame 23.

An exhaust opening 26 is formed on a top barrel body of the pressure chamber shell 1.

A description of the single-use process of the rapid rotation opening type high-pressure rock triaxial pressure chamber with a loading structure is given below in combination with the FIGURE:

In the embodiment, the rock specimens 24 are cylindrical specimens which are 50 mm in diameter and 100 mm in height. In the pressure chamber shell 1, the largest confining pressure is 100 MPa, and the largest axial pressure is 1000 kN. The first rock specimen access opening 7, the second rock specimen access opening 8, the third rock specimen access opening 11, the first plugging block 9 and the second plugging block 10 are circular or elliptical. Threaded holes are formed on outer surfaces of the first plugging block 9 and the second plugging block 10, and are used for assisting in disassembling and assembling of the first plugging block 9 and the second plugging block 10. The pressure chamber shell 1, the pressure chamber sealing and spacing sleeve 2 and the actuator cylinder barrel 4 are all manufactured through an alloy steel forging and thermal processing technology, so that the loading structure is guaranteed to have enough rigidity. An auxiliary supporting structure is connected to the actuator cylinder barrel 4, so that the pressure chamber is wholly and fixedly placed on a test bed.

Before a loading test, firstly the prepared rock specimens 24 are sealed, the sealed rock specimens 24 are placed aside for subsequent tests, then the pressure chamber is wholly adjusted to the initial state before tests. Under the initial state, the third rock specimen access opening 11 of the pressure chamber sealing and spacing sleeve 2 and the first rock specimen access opening 7 of the pressure chamber shell 1 are directly opposite mutually, the first plugging block 9 is not mounted in the first rock specimen access opening 7, but the second plugging block 10 is mounted in the second rock specimen access opening 8, and the actuator piston rod 5 is at a lower limit position. It should be noted that the effects of the first rock specimen access opening 7 are completely the same as those of the second rock specimen access opening 8, and the decision of using which rock specimen access opening needs to be made as required. In addition, the two rock specimen access openings which are the same are designed, so that the symmetrical stress state of the pressure chamber shell 1 is well guaranteed.

After the pressure chamber is adjusted to the initial state, the sealed rock specimens 24 are placed on the rock specimen supporting frame 23 at the top portion of the actuator piston rod 5 after passing through the third rock specimen access opening 11 and the first rock specimen access opening 7. Then the first plugging block 9 is mounted back in the first rock specimen access opening 7. Then the pressure chamber sealing and spacing sleeve 2 rotates by 90 degrees. At this time, the first rock specimen access opening 7 in which the first plugging block 9 is mounted is sealed in the pressure chamber sealing and spacing sleeve 2. And at this time, mounting of the rock specimens 24 is completed.

After the mounting work of the rock specimens 24 is completed, a confining pressure applying step is executed. Firstly, a low-pressure oil pump is used for charging hydraulic oil in the inner cavity of the pressure chamber shell 1 from the confining pressure oil opening 12. In the oil charging process, the exhaust opening 26 is in the opened state, along with the continuous charging of the hydraulic oil, air in the inner cavity of the pressure chamber shell 1 can be gradually exhausted until hydraulic oil flows out of the exhaust opening 26, and oil charging is finished. And then, the exhaust opening 26 is closed firstly, then the low pressure oil pump is switched into a high pressure oil pump, and confining pressure loading is finished through the high pressure oil pump.

After confining pressure applying step is finished, a maximum principal stress loading step is executed. Firstly, the stress loading oil opening 16 is used for charging oil into the stress loading cavity 15 of the actuator cylinder barrel 4 so as to drive the actuator piston rod 5 to move upwards and drive the rock specimens 24 to synchronously move upwards until the rock specimens 24 are in contact with the force measuring sensor 25. And then according to the whole destruction process test requirements of the rock specimens 24, a computer servo control loading system is executed until the rock specimens 24 are destroyed to fail.

After the loading test of the rock specimens 24 is finished, firstly, confining pressure is unloaded, and then axial load is unloaded. When the confining pressure is unloaded, firstly, the high pressure oil pump is turned off, the pressure of the confining pressure oil opening 12 is reduced to be zero, then the exhaust opening 26 is opened, and then high pressure air is charged through the exhaust opening 26, so that the hydraulic oil in the inner cavity of the pressure chamber shell 1 is drained from the confining pressure oil opening 12. When the axial load is unloaded, oil is charged in the stress unloading cavity 17 of the actuator cylinder barrel 4 through the stress unloading oil opening 18, so that the actuator piston rod 5 is driven to move downwards to the lower limit position.

After the actuator piston rod 5 moves to the lower limit position, the pressure chamber sealing and spacing sleeve 2 rotates by 90 degrees again, so that the third rock specimen access opening 11 and the first rock specimen access opening 7 recover to be direct opposite mutually. Then the first plugging block 9 is taken down from the first rock specimen access opening 7. Finally, the rock specimens 24 after being destroyed to fail are taken out through the third rock specimen access opening 11 and the first rock specimen access opening 7.

The scheme in the embodiment is not used for limiting the protection range of the patent, and any equivalent implementation or change which is not separated from the invention is included in the patent range of the scheme.

What is claimed is:

1. A rapid rotation opening type high-pressure rock triaxial pressure chamber with a loading structure, comprising a pressure chamber shell, a pressure chamber sealing and spacing sleeve, a thrust ball bearing, an actuator cylinder barrel, an actuator piston rod and an actuator sealing flange cover;

wherein the pressure chamber shell is a cylindrical barrel structure and is vertically arranged, a lower end barrel opening of the pressure chamber shell faces downwards, and a flange edge is arranged on an outer periphery of the lower end barrel opening of the pressure chamber shell;

wherein, the thrust ball bearing is sleeved on an outer side of the pressure chamber shell, a central axis of the thrust ball bearing overlaps with a central axis of the pressure chamber shell, and a lower part bearing ring of the thrust ball bearing is fixedly connected with the flange edge at the lower end barrel opening of the pressure chamber shell;

wherein the pressure chamber sealing and spacing sleeve is sleeved on the outer side of the pressure chamber shell, a central axis of the pressure chamber sealing and spacing sleeve overlaps with the central axis of the pressure chamber shell, the pressure chamber sealing and spacing sleeve is located above the thrust ball bearing, a bottom end of the pressure chamber sealing and spacing sleeve is fixedly connected with an upper part bearing ring of the thrust ball bearing, and a rotation gap is formed between the pressure chamber sealing and spacing sleeve and the pressure chamber shell;

wherein a first rock specimen access opening and a second rock specimen access opening are respectively formed at two opposite sides on a lateral barrel wall of the pressure chamber shell, the first rock specimen access opening and the second rock specimen access opening are the same in size, shape and height position and are formed directly facing each other;

wherein a first plugging block is arranged at the first rock specimen access opening, and the first plugging block and the first rock specimen access opening are in a sealing and sliding cooperation manner;

wherein a second plugging block is arranged at the second rock specimen access opening, and the second plugging block and the second rock specimen access opening are in a sealing and sliding cooperation manner;

wherein a third rock specimen access opening is formed on a barrel wall of the pressure chamber sealing and spacing sleeve, the third rock specimen access opening, the first rock specimen access opening and the second rock specimen access opening are in the same height, and a hole diameter of the third rock specimen access opening is larger than that of the first rock specimen access opening and that of the second rock specimen access opening;

wherein the actuator cylinder barrel is a cylindrical barrel structure and is vertically arranged, an upper end barrel opening of the actuator cylinder barrel faces upwards, a flange edge is arranged on an outer periphery of the upper end barrel opening of the actuator cylinder barrel, the upper end barrel opening of the actuator cylinder barrel is abutted with the lower end barrel opening of the pressure chamber shell, the flange edge at the upper end barrel opening of the actuator cylinder barrel is fixedly connected with the flange edge at the lower end barrel opening of the pressure chamber shell through high-strength bolts, a counterforce main body loading maximum principal stress is jointly formed by the pressure chamber shell and the actuator cylinder barrel, and a central axis of the actuator cylinder barrel overlaps with the central axis of the pressure chamber shell;

wherein the actuator piston rod is arranged in the actuator cylinder barrel, a central axis of the actuator piston rod overlaps with the central axis of the actuator cylinder barrel, and a middle part rod body of the actuator piston rod and the actuator cylinder barrel are in a sealing and sliding cooperation manner; and wherein the actuator sealing flange cover is fixedly mounted at the upper end barrel opening of the actuator cylinder barrel through high-strength bolts, the actuator sealing flange cover and the upper end barrel opening of the actuator cylinder barrel are in a sealing cooperation manner, a piston rod penetrating and mounting hole is formed in a center of the actuator sealing flange cover, an upper part rod body of the actuator piston rod penetrates through the piston rod penetrating and mounting hole of the actuator sealing flange cover and extends to an inner part of the pressure chamber shell, and the upper part rod body of the actuator piston rod and the actuator sealing flange cover are in a sealing and sliding cooperation manner.

2. The rapid rotation opening type high-pressure rock triaxial pressure chamber according to the claim 1, wherein a confining pressure oil opening is formed on a bottom barrel body of the pressure chamber shell, a pressure balance cavity is formed on a bottom barrel body of the actuator cylinder barrel, a pressure balance oil opening is formed on the actuator cylinder barrel below the pressure balance cavity, and the pressure balance oil opening communicates with the confining pressure oil opening; and wherein a lower part rod body of the actuator piston rod extends into the pressure balance cavity, and the lower part rod body of the actuator piston rod and the pressure balance cavity are in a sealing and sliding cooperation manner.

3. The rapid rotation opening type high-pressure rock triaxial pressure chamber, according to the claim 1, wherein an annular space in the actuator cylinder barrel below the middle part rod body of the actuator piston rod is a stress loading cavity, and a stress loading oil opening is formed on the actuator cylinder barrel at a corresponding position of the stress loading cavity; and wherein an annular space in the actuator cylinder barrel above the middle part rod body of the actuator piston rod is a stress unloading cavity, and a stress unloading oil opening is formed on the actuator cylinder barrel at a corresponding position of the stress unloading cavity.

4. The rapid rotation opening type high-pressure rock triaxial pressure chamber according to the claim 2, wherein a piston displacement monitoring rod is mounted on the actuator cylinder barrel below the pressure balance cavity in a sealing and sliding cooperation manner, an upper end of the piston displacement monitoring rod is fixedly connected to a bottom end of the actuator piston rod, a lower end of the piston displacement monitoring rod extends to an outside of the actuator cylinder barrel, a transferring propping rod is fixedly connected to the lower end of the piston displacement monitoring rod, and a displacement sensor is connected between the transferring propping rod and the actuator cylinder barrel.

5. The rapid rotation opening type high-pressure rock triaxial pressure chamber according to the claim 1, wherein an oil leakage monitoring opening is formed on the actuator cylinder barrel at a corresponding position of the actuator sealing flange cover.

6. The rapid rotation opening type high-pressure rock triaxial pressure chamber according to the claim 1, wherein a rock specimen supporting frame is fixedly mounted at a top portion of the actuator piston rod, is located in the pressure chamber shell, and is used for allowing rock specimens to be placed thereon, and a force measuring sensor is fixedly hoisted on an inner barrel wall at a top portion of the pressure chamber shell right above the rock specimen supporting frame.

7. The rapid rotation opening type high-pressure rock triaxial pressure chamber according to the claim 1, wherein an exhaust opening is formed on a top barrel body of the pressure chamber shell.

\* \* \* \* \*